United States Patent [19]
Fishlock

[11] 3,977,491
[45] Aug. 31, 1976

[54] GAS-CUSHION VEHICLES

[75] Inventor: Ronald Christopher Fishlock, Toronto, Canada

[73] Assignee: Hovermarine Transport Limited, Southampton, England

[22] Filed: Oct. 6, 1975

[21] Appl. No.: 620,117

Related U.S. Application Data

[63] Continuation of Ser. No. 407,839, Oct. 19, 1973, abandoned.

[30] Foreign Application Priority Data

Oct. 23, 1972 United Kingdom............... 48771/72

[52] U.S. Cl................................. 180/120; 180/128
[51] Int. Cl.².......................................... B60V 1/04
[58] Field of Search .......... 180/120, 124, 125, 126, 180/127, 128, 116, 117, 118; 114/67 R, 67 A

[56] References Cited
UNITED STATES PATENTS

| | | | |
|---|---|---|---|
| 3,243,004 | 3/1966 | Mackie | 180/124 |
| 3,285,356 | 11/1966 | Cockerell | 180/127 |
| 3,318,404 | 5/1967 | Hopkins et al. | 180/128 |
| 3,690,401 | 9/1972 | Earl | 180/124 |

FOREIGN PATENTS OR APPLICATIONS

| | | | |
|---|---|---|---|
| 1,028,045 | 5/1966 | United Kingdom | 180/124 |
| 1,253,382 | 11/1971 | United Kingdom | 114/67 A |

*Primary Examiner*—M. H. Wood, Jr.
*Assistant Examiner*—Jack D. Rubenstein
*Attorney, Agent, or Firm*—Holman & Stern

[57] ABSTRACT

An air-cushion vehicle is provided with an inflatable flexible skirt of bag-like form. The bottom of the skirt defines a convex face in close proximity to the surface over which the vehicle travels so as to form an atmosphere-seeking plenum gap. The flexible skirt is impermeable except for the convex face which is perforated so as to allow skirt inflation air to bleed through the face and suppress any vibration induced by the Bernoulli effect.

8 Claims, 2 Drawing Figures

GAS-CUSHION VEHICLES

This is a continuation of application Ser. No. 407,839, filed Oct. 19, 1973, now abandoned.

BACKGROUND OF THE INVENTION

This invention relates to gas-cushion vehicles, that is to say, to vehicles for travelling over a surface and which, in operation, are supported above that surface, at least in part, by a cushion of pressurized gas, for example, air, formed and contained between the vehicle body and the surface.

The vehicle-supporting cushion may be contained, at least in part, by a flexible skirt of hollow inflatable form depending from the vehicle body so that the bottom of the skirt defines a convex face in close proximity to the surface over which the vehicle is to travel so as to form a "plenum" gap through which an atmosphere-seeking flow of cushion gas escapes.

Unfortunately, however, such flexible skirts are often subject to severe vibration by this escape of gas through the plenum gap. Due to the Bernoulli effect, the pressure of the atmosphere-seeking gas falls substantially as it passes through the gap. This local fall in pressure tends to suck the skirt downwardly which, in turn, causes the gap to be reduced, leading to a local rise in pressure. Repetition of the cycle gives rise to the above-mentioned vibration.

SUMMARY OF THE INVENTION

According to the invention, a gas-cushion vehicle is provided with a flexible skirt of hollow inflatable form depending from the vehicle body so that the bottom of the skirt defines a convex face in close proximity to the surface over which the vehicle is to travel so as to form a plenum gap through which an atmosphere-seeking flow of cushion gas escapes, with the flexible skirt being impermeable except for the convex face so that skirt inflation fluid can bleed through said convex face to suppress any tendency for local pressure changes to take place in said flow as a result of the Bernoulli effect.

By "close-proximity" is meant close enough to allow the Bernoulli effect to take place.

The invention is particularly suitable in connection with "sidewall" gas-cushion vehicles. That is to say, gas-cushion vehicles for travelling over the surface of water, wherein, in operation, the sides of each of their vehicle-supporting cushions are contained by a pair of laterally-spaced "side" wall structures extending longitudinally along the sides of the vehicle body in substantially parallel array and depending therefrom so as to dip into the water and form a cushion-gas seal. The flexible skirt incorporated in the invention can be used to contain cushion gas at one end of the cushion.

BRIEF DESCRIPTION OF THE DRAWINGS

The invention will now be described by way of example with reference to the accompanying drawings, wherein.

DESCRIPTION OF THE PREFERRED EMBODIMENT

Figure 1:
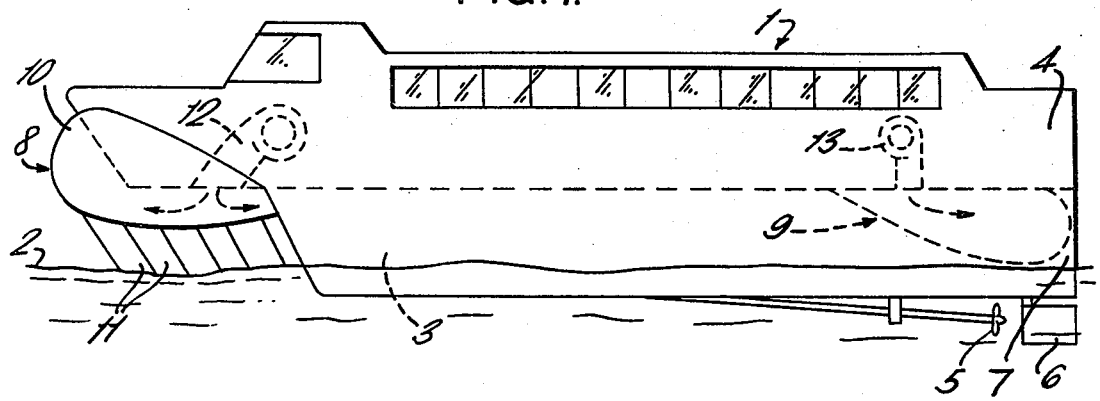
FIG. 1 is a side view of a side-wall gas-cushion vehicle.
Figure 2:
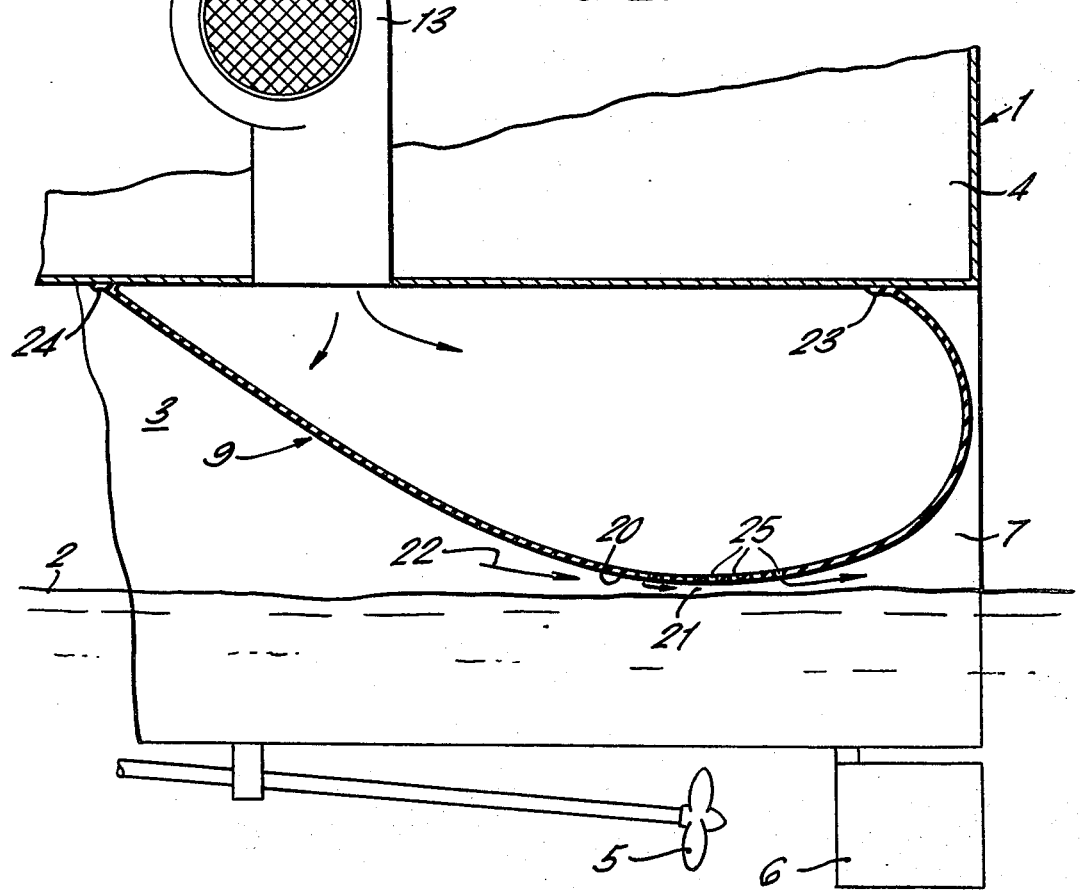
FIG. 2 is an enlarged view, in medial section, of the rear flexible skirt shown in FIG. 1.

Referring to FIGS. 1 and 2, a side-wall gas-cushion vehicle 1 is shown travelling over a surface 2 of water, supported by a cushion 3 of pressurized air formed and contained between a vehicle body 4 and the surface 2. The vehicle 1 is propelled by a pair of water-screw propellers 5 and is steered by a pair of rudders 6.

The sides of the vehicle-supporting cushion 3 are contained by a pair of laterally-spaced sidewall structures 7 and extending longitudinally along the sides of the vehicle body 4 in substantially parallel array. The sidewalls 7 depend from the sides of the vehicle body 4 so as to dip into the water and form a cushion seal. Each sidewall 7 carries a water screw propeller 5 and a rudder 6.

The front or bow end of the cushion 3 is contained by a flexible skirt 8 and the rear or stern end thereof by a flexible skirt 9. The skirts 8, 9, which are of hollow, inflatable form, and constructed from rubberized fabric, extend laterally between (and in the case of the skirt 8, beyond, i.e., forwardly, as well) the front and rear ends of the sidewalls 7. The skirts 8, 9, are attached to the vehicle body 4 and depend therefrom. The flexible skirt 8 is in light contact with the water surface 2. The inflation and tension forces set up in the flexible skirt 9 ensure that it is maintained clear of but in close proximity to the surface 2.

The front flexible skirt 8 is of two-stage form and comprises an inflated bag 10 from which depend a succession of independently-deflectable flexible wall or skirt members 11 of the form disclosed by British Patent specification No. 1,043,351. Air forming the vehicle-supporting cushion 3 is provided by a pair of centrifugal fans 12 (only one shown) disposed side by side. Air from the fans 12 passes through the flexible skirt 8 to inflate it before entering the space occupied by the cushion 3. The rear flexible skirt 9 is inflated by air supplied by a centrifugal fan 13. The fans 12 and fan 13 form separate means for supplying air to the space occupied by the vehicle-supporting cushion 3 and the skirt 9 respectively.

As best shown in FIG. 2, the bottom of the rear flexible skirt 9 defines a convex face 20 in close proximity to the surface 2 so as to form a plenum gap 21 through which an atmosphere-seeking flow 22 of cushion air escapes. The flexible skirt 9 is of impermeable form except for the convex face 20 so that skirt inflation air can bleed through the face 20 to suppress any tendency for local pressure changes to take place in the flow 22 as a result of the Bernoulli effect.

In further detail, the flexible skirt 9 comprises a sheet of rubberized fabric having a shape which in the vertical cross-section shown extends outwardly and downwardly from a first point of attachment 23 on the vehicle body 4 and then inwardly and upwardly in a smooth curve to a second point of attachment 24 on the body 4, so as to present the convex face 20 towards the surface 2.

The convex face 20 is made permeable by a multiplicity of bleed holes 25 formed therein. The holes 25 are about 1/8 inch in diameter and are regularly distributed in rows, with one hole 25 for each square inch of material. The maximum depth of the flexible skirt 9 is 3 ft. The fan 13 supplies inflation air to the skirt interior at slightly above cushion pressure.

In operation, were it not for the bleed holes 25, the atmosphere-seeking flow 22 of cushion air would pass smoothly through the plenum gap 21, where, due to the Bernoulli effect, local pressure changes (chiefly adjacent the outer boundary of the gap 21) would cause vibration of the skirt. However, the bleed holes 25 allow skirt inflation air to enter the gap and interfere with the smooth laminar flow therethrough which would otherwise take place. It is also possible that the bleed holes 25 allow some backflow of air to occur which assist in the suppression of the Bernoulli effect.

The convex face 20 could comprise a strip of material demountably attached to the remainder of the skirt 9. It could comprise uncoated fabric so that is naturally permeable. Nylon netting may thus be suitable. Another alternative is woven cloth, treated, (for example by dipping), with a synthetic plastic material such as polyurethane so as to prevent the threads of the cloth from slipping over each other.

The flexible skirt of the invention need not be confined to sidewall gas-cushion vehicles. It may also be used, for example, in "plenum chamber" vehicles where it is of annular form so as to contain the whole periphery of a cushion.

I claim:

1. A vehicle for travelling over a surface and which, in operation, is supported above such surface by a cushion of pressurized gas contained beneath the vehicle, comprising a body having front and rear ends and a pair of laterally spaced side walls extending longitudinally of the body in substantial parallelism so as to dip into the surface and provide a cushion seal, a flexible skirt of hollow inflatable form depending from the vehicle body and extending laterally between the side walls adjacent the rear end of the body so that the bottom of the skirt defines a convex face in close proximity to the surface over which the vehicle is travelling to form a plenum gap between the surface and convex face through which an atmosphere-seeking flow of cushion gas escapes at the rear end of the body, the flexible skirt being impermeable except for said convex face, and said convex face being provided with a multiplicity of bleed holes so that skirt inflation fluid can bleed through said convex face to suppress any tendency for local pressure changes to take place in said flow as a result of the Bernoulli effect.

2. A vehicle as claimed in claim 1 wherein the permeable face of the flexible skirt defines a multiplicity of bleed holes.

3. A vehicle for travelling over a water surface and in which, in operation, is supported by a cushion of pressurized gas contained beneath the vehicle, comprising a body having front and rear ends and a pair of laterally-spaced side walls extending longitudinally of the body in substantial parallelism so as to dip into the water surface and provide a cushion seal, a flexible skirt of impermeable material extending laterally between the side walls adjacent the rear end of the body, said flexible skirt having first and second end portions and a wall between the end portions, the first and second end portions being secured to the body at axially-spaced locations so that when inflated and viewed in the direction of the side walls, the wall extends outwardly and downwardly from the first end portion and thence inwardly and upwardly to the second end portion to provide a bottom having a convex face located in close proximity to the surface over which the vehicle is travelling to define a plenum gap through which an atmosphere-seeking flow of cushion gas escapes at the rear end of the body, the convex face of the bottom of said skirt only having a multiplicity of bleed holes so that skirt inflation fluid can bleed through the convex face to suppress any tendency for local pressure changes to take place in said flow as a result of the Bernoulli effect.

4. The vehicle as claimed in claim 3, in which the bleed holes are regularly distributed in rows and there is one bleed hole for each square inch of material.

5. A vehicle as claimed in claim 3 provided with means at the front end of the vehicle for supplying pressurized gas to beneath the vehicle so as to form said cushion, and separate means at the rear of said vehicle for supplying inflation gas to said flexible skirt.

6. A vehicle as claimed in claim 5 provided with a second flexible skirt extending laterally between the side walls adjacent the front end of the body, said flexible skirt being of inflatable form, and means for directing pressurized gas discharged by said first-mentioned gas supply means into said second flexible skirt so as to inflate it.

7. A method of operating a gas-cushion vehicle comprising the steps of:
   a. providing the vehicle with a hollow skirt of hollow inflatable form depending from the vehicle body and defining with the bottom of the skirt a convex face in close proximity to the surface over which the vehicle travels and forming a plenum gap through which an atmosphere-seeking flow of cushion gas escapes;
   b. forming the flexible skirt so that it is impermeable except for the convex face;
   c. inflating the skirt so that inflation fluid bleeds through the convex face and suppresses any tendency for local pressure changes to develop in the flow as a result of the Bernoulli effect.

8. The method as claimed in claim 7 including the steps of forming the vehicle body with laterally-spaced side walls extending longitudinally of the body and forming a cushion of pressurized gas beneath the vehicle body; providing the vehicle body at its front end with means for supplying pressurized gas beneath said body and forming said cushion; and providing separate means for directing pressurized fluid to both said forward means and first-mentioned hollow inflatable skirt.